US009430355B2

(12) United States Patent
Braun et al.

(10) Patent No.: US 9,430,355 B2
(45) Date of Patent: Aug. 30, 2016

(54) SYSTEM DIAGNOSTICS WITH THREAD DUMP ANALYSIS

(71) Applicants: Matthias Braun, Illingen (DE); Dietrich Mostowoj, Ludwigshafen am Rhein (DE); Ralf Schmelter, Wiesloch (DE); Thomas Klink, Moerlenbach (DE); Steffen Schreiber, Frankenthal (DE); Johannes Scheerer, Heidelberg (DE); Michael Wintergerst, Muelhausen (DE)

(72) Inventors: Matthias Braun, Illingen (DE); Dietrich Mostowoj, Ludwigshafen am Rhein (DE); Ralf Schmelter, Wiesloch (DE); Thomas Klink, Moerlenbach (DE); Steffen Schreiber, Frankenthal (DE); Johannes Scheerer, Heidelberg (DE); Michael Wintergerst, Muelhausen (DE)

(73) Assignee: SAP SE, Walldorf (DE)

( * ) Notice: Subject to any disclaimer, the term of this patent is extended or adjusted under 35 U.S.C. 154(b) by 133 days.

(21) Appl. No.: 14/490,206

(22) Filed: Sep. 18, 2014

(65) Prior Publication Data

US 2016/0085656 A1    Mar. 24, 2016

(51) Int. Cl.
*G06F 11/34*      (2006.01)

(52) U.S. Cl.
CPC ................. *G06F 11/3476* (2013.01)

(58) Field of Classification Search
CPC ............ G06F 11/366; G06F 11/0715; G06F 11/079; G06F 11/0778; G06F 11/3476; G06F 11/0751
See application file for complete search history.

(56) References Cited

U.S. PATENT DOCUMENTS

| | | | | |
|---|---|---|---|---|
| 8,626,904 B1* | 1/2014 | Olliff | ...................... | G06F 9/524 709/224 |
| 2007/0220513 A1* | 9/2007 | Hwang | .................... | G06F 9/524 718/1 |
| 2012/0079596 A1* | 3/2012 | Thomas | ................... | G06F 21/55 726/24 |
| 2013/0091380 A1* | 4/2013 | Decesaris | ........... | G06F 11/1428 714/11 |
| 2014/0310714 A1* | 10/2014 | Chan | ................. | G06F 17/30598 718/102 |

OTHER PUBLICATIONS

"DeveloperWorks: IBM Monitoring and Diagnostic Tools for Java—Dump Analyzer Version 2.2", [Online]. Retrieved from the Internet: <URL: http://www/ibm.com/developerworks/java/jdk/tools/dumpanalyzer/, (Accessed Aug. 15, 2014), 3 pgs.
"Samurai—a GUI based tail, thread dump analysis tool", Yusuke Yamamoto, [Online]. Retrieved from the Internet: <URL: http://samaraism.jp/samurai/en/index.html, (Accessed Aug. 15, 2014), 7 pgs.
"TDA—Thread Dump Analyzer", Ingo Rockel, (Sep. 2008), 21 pgs.
Lange, Fabian, "Create and Understand Java Heapdumps (Act 4)", codecentric Blog, [Online]. Retrieved from the Internet: <URL: https://blog.codecentric.de/en/2011/08/create-and-understand-java-headumps-act-4>, (Aug. 4, 2011), 10 pgs.
Vogel, Lars, "Eclipse Memory Analyzer (MAT)—Tutorial", Version 1.1, [Online]. Retrieved from the Internet: <URL: http://www.vogella.com/tutorials/EclipseMemoryAnalyzer/article.htm >, (Apr. 30, 2013), 6 pgs.

* cited by examiner (Continued)

*Primary Examiner* — Jigar Patel
(74) *Attorney, Agent, or Firm* — Schwegman Lundberg & Woessner, P.A.

(57) ABSTRACT

A thread dump analysis tool analyzes a series of thread dumps and identifies one or more potential problems in the application from which the thread dumps were generated. Hints regarding the potential problems are presented. The hints can be generated based on relative values generated by analysis of sequential dumps. The hints may be hints that could not be generated by analysis of a single thread dump. Other hints may be hints that are enhanced by analysis of multiple thread dumps, whose importance is made clearer by appearance in multiple thread dumps, or that are unchanged in detection, importance, or both, by the use of multiple thread dumps. The hints can then be presented in order of importance. Additionally or alternatively, hints below a certain threshold of importance can be hidden.

17 Claims, 13 Drawing Sheets

| Hints with Very High Relevance ⸺ 505 |
|---|
| + Socket IO without progress ⸺ 510<br>− Socket IO without progress ⸺ 515<br>520 ⸺ ► Thread Galaxy 2000901 / Follower Worker / Script [cceaq.de/mdm/customer/process/soldto/MDM<br>Customer Update ... was reading from host ACSix100 port 8047 (local port: 33452) without transferring<br>bytes in the last 4m 4s which is about 100% of the thread's running time.<br>525 ⸺ ► The thread seems to be waiting for an answer from the server socket.<br>530 ⸺ ► The thread's stack:<br>    java.net.SocketInputStream.socketRead0(java.io.FileDescriptor,byte[], int, int, int) int<br>    java.net.SocketInputStream.read(byte[], int, int) int<br>    java.io.BufferedInputStream.fill() void<br>    java.io.BufferedInputStream.read() int<br>    com.sap.engine.services.webservices.jaxm.soap.HTTPSocket.readLine(java.io.InputStream)<br>    java.lang.String<br>535 ⸺ more methods<br>+ Method Hotspot ⸺ 540<br>    The method sun.nio.cs.UTF_8$Encoder.encodeArrayLoop could be a hotspot which was on top in 14% of<br>    all cases. |
| Hints with High Relevance ⸺ 545 |
| + Passive Thread ⸺ 550<br>    A runnable thread remained in method sun.misc.Unsafe.defineClass without any progress in the last 47.4 s |
| Hints with Low Relevance ⸺ 555 |
| + Lock Contention ⸺ 560<br>    A lock of time java.util.TimeZone blocked 21 threads for at least 8m 28s in total which is about 21% of total<br>    blocking time |

| Numeric Relevance Rating | Text Relevance Rating |
|---|---|
| 0.9-1.0 | Very High Relevance |
| 0.75-0.9 | High Relevance |
| 0.25-0.75 | Medium Relevance |
| 0.1-0.25 | Low Relevance |
| 0.0-0.1 | Very Low Relevance |

*FIG. 6*

SYSTEM DIAGNOSTICS WITH THREAD DUMP ANALYSIS

TECHNICAL FIELD

The subject matter disclosed herein generally relates to the processing of data. Specifically, the present disclosure addresses systems and methods for processing and presenting thread dumps and diagnosing systems.

BACKGROUND

Application developers use thread dumps to help identify problems in applications being developed. The thread dump often includes information about one or more threads of an application. For example, the thread dump can indicate the current method executing in each thread, along with a stack trace for the thread. An application developer may use a tool to view the thread dump and more easily navigate the presented data.

Viewing tools present a number of options to users. A user can select a dump to view from a list of available dumps. After loading a selected dump, information for each thread can be presented in a table. Alternative views may also be available, such as a view of total memory allocation organized by the type of object consuming the memory.

BRIEF DESCRIPTION OF THE DRAWINGS

Some embodiments are illustrated by way of example and not limitation in the figures of the accompanying drawings.

FIG. 5 is a user interface diagram, according to some example embodiments, suitable for presenting system diagnostics with thread dump analysis.

FIG. 6 is a table of relevance ratings, according to some example embodiments, suitable for generating and presenting system diagnostics with thread dump analysis.

DETAILED DESCRIPTION

Example methods and systems are directed to system diagnostics with thread dump analysis. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A thread dump analysis tool can analyze a series of thread dumps and present aggregate data for each thread dump. For example, the time of the dump, the number of threads in the dump, the total memory usage by all threads in the dump, and so on. In addition to or instead of these absolute data, relative data based on changes between sequential dumps can be presented. This includes, for example, the amount of CPU time consumed in the time between two dumps, the amount of file input/output (I/O) in the time between two dumps, the amount of network I/O in the time between two dumps, the changes in thread states between two dumps, and so on.

The thread dump analysis tool can present one or more hints for potential problems in the application from which the series of thread dumps is generated. The hints can be generated based on relative values generated by analysis of sequential dumps. For example, a hint indicating that socket I/O is not progressing may be generated based on a determination that a thread is reading from a port without actually receiving data. The hints may be hints that could not be generated by analysis of a single thread dump. For example, merely observing that a thread is reading from a socket does not indicate that socket I/O is not progressing. Instead, the determination is based on a measurement that the thread has been reading for at least a certain period of time without progress. Other hints may be hints that are enhanced by analysis of multiple thread dumps, whose importance is made clearer by appearance in multiple thread dumps, or that are unchanged in detection, importance, or both, by the use of multiple thread dumps.

The importance of each hint can be generated numerically, based on heuristics for each type of hint. The hints can then be presented in order of importance. Additionally or alternatively, hints below a certain threshold of importance can be hidden. The importance of a hint can be represented by a numeric relevance score, or a human-readable relevance phrase, such as "Very High Relevance."

Figure 1:
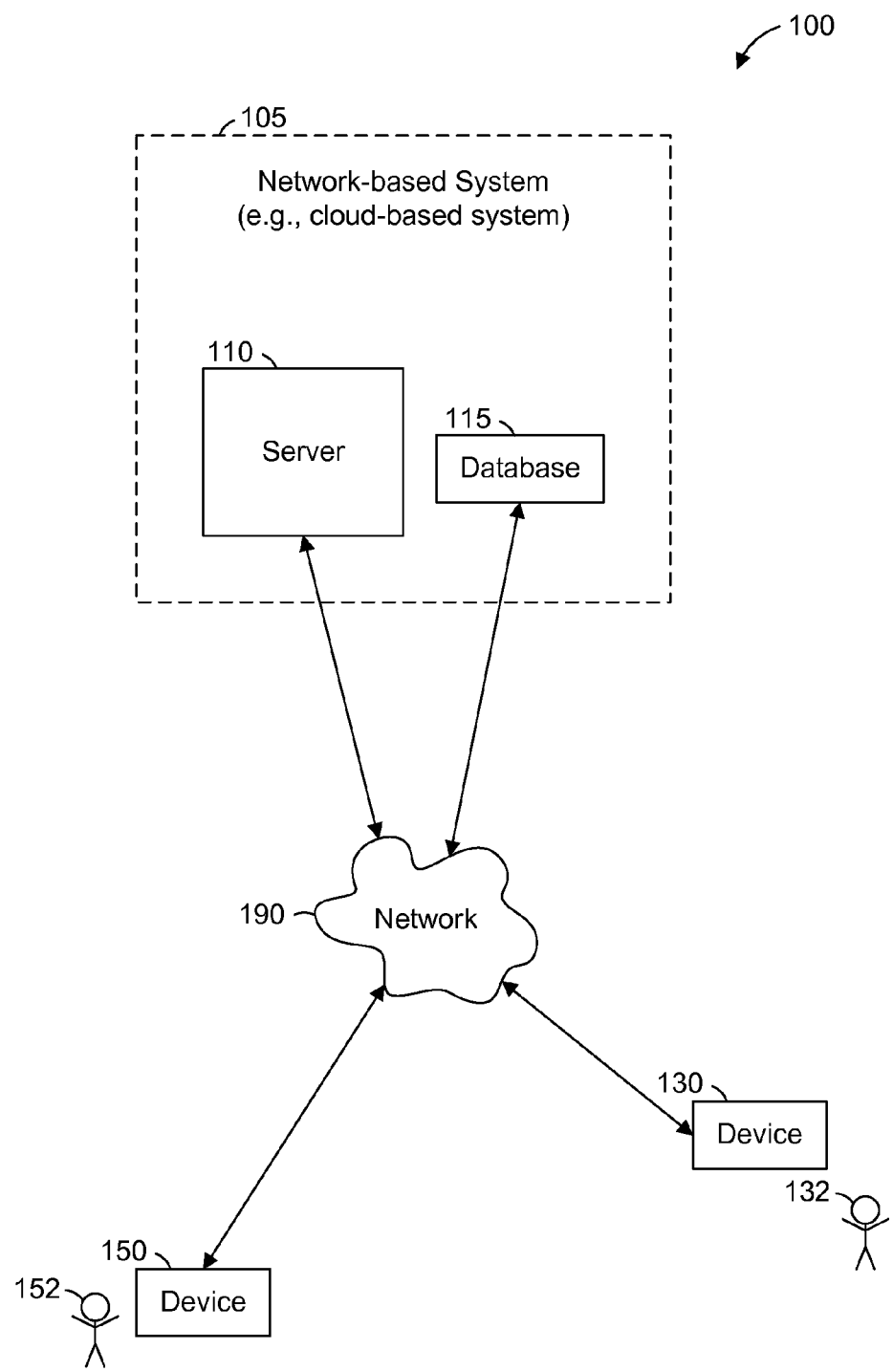
FIG. 1 is a network diagram illustrating a network environment suitable for generating and presenting system diagnostics with thread dump analysis, according to some example embodiments.

FIG. 1 is a network diagram illustrating a network environment 100 suitable for generating and presenting system diagnostics with thread dump analysis, according to some example embodiments. The network environment 100 includes a server machine 110, a database 115, and devices 130 and 150, all communicatively coupled to each other via a network 190. The server machine 110 and the database 115 may collectively comprise a cloud-based system 105 capable of responding to client requests from devices 130 and 150. The server machine 110 and the devices 130 and 150 may each be implemented in a computer system, in whole or in part, as described below with respect to FIG. 13.

Also shown in FIG. 1 are users 132 and 152. One or both of the users 132 and 152 may be a human user, a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 13. As used herein, a "database" is a data storage resource and may store data structured as a text file, a table, a spreadsheet, a relational database (e.g., an object-relational database), a triple store, a hierarchical data store, or any suitable combination thereof. The database may be an in-memory database. The in-memory database may be capable of much higher performance than a disk-based database. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
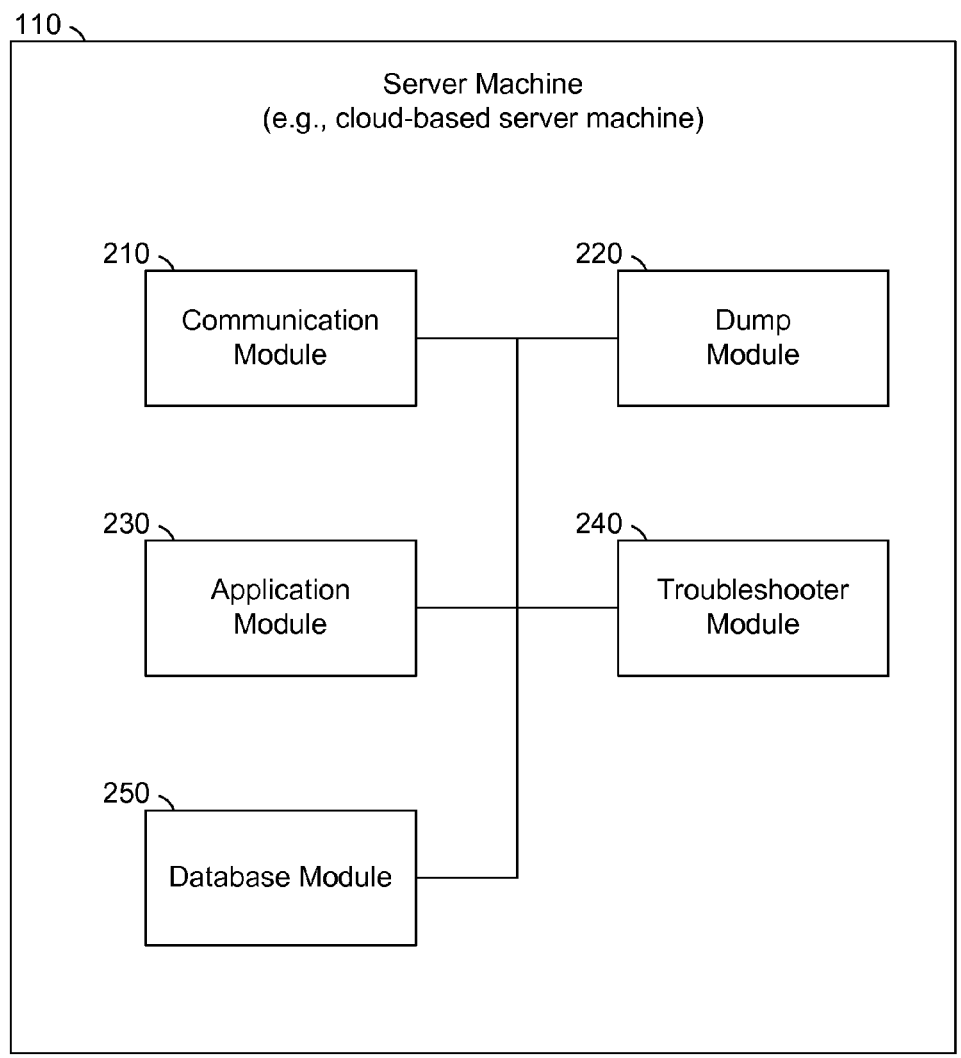
FIG. 2 is a block diagram of a server machine, according to some example embodiments, suitable for generating and presenting system diagnostics with thread dump analysis.

FIG. 2 is a block diagram illustrating components of the server machine 110, according to some example embodiments, suitable for generating and presenting system diagnostics with thread dump analysis. The server machine 110 is shown as including a communication module 210, a dump module 220, an application module 230, a troubleshooter module 240, and a database module 250, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The operations of the modules 210-250 are discussed in more detail below in the discussion of FIGS. 4-11. The communication module 210 receives requests to generate dumps, to analyze existing dumps, or both. The request to generate dumps contains one or more of the following: a number of thread dumps to be generated, a period of time to delay between each successive thread dump, and a time delay before the generation of the first thread dump.

The dump module 220 generates thread dumps for an application run by an application module 230. The dump module 220 and the application module 230 may be a single module. For example, a Java virtual machine (JVM) that runs an application may also generate the thread dump for the application. The dump module 220 and the application module 230 may be separate modules. For example, a separate software or hardware tool can be used to take a snapshot of data stored in memory (e.g., random access memory (RAM), solid state memory, hard disk memory, etc.) and generate a thread dump for the application being analyzed. The generated thread dumps may be stored in a database by the database module 250.

A thread dump contains information for one or more threads of an application, and may also contain additional information for the application itself. Information for a single thread includes one or more of the following: an identifier, a name, a priority, a scheduler state (e.g., sleeping, running, blocked, or waiting), and a stack trace. The information provided for the thread is current as of the time of the thread dump. A stack trace for a thread can include the called methods and lock object information.

The thread dump may also include additional information for the thread, such as the total CPU time the thread has consumed, the elapsed time the thread has been running, the total amount of memory allocated by the thread (e.g., the total number of bytes allocated in the heap), the number of files opened by the thread, the number of sockets opened by the thread, and the number of bytes read and written to each file or socket. Additionally, the thread dump may indicate the current file or socket being accessed if the stack trace shows that the thread is currently performing a file or network-related operation, respectively.

The troubleshooter module 240 analyzes the generated dumps. The communication module 210 can respond to a request for dump analysis by communicating the results of the analysis. For example, the analysis may be transmitted over a network or presented on a user interface.

Figure 3:
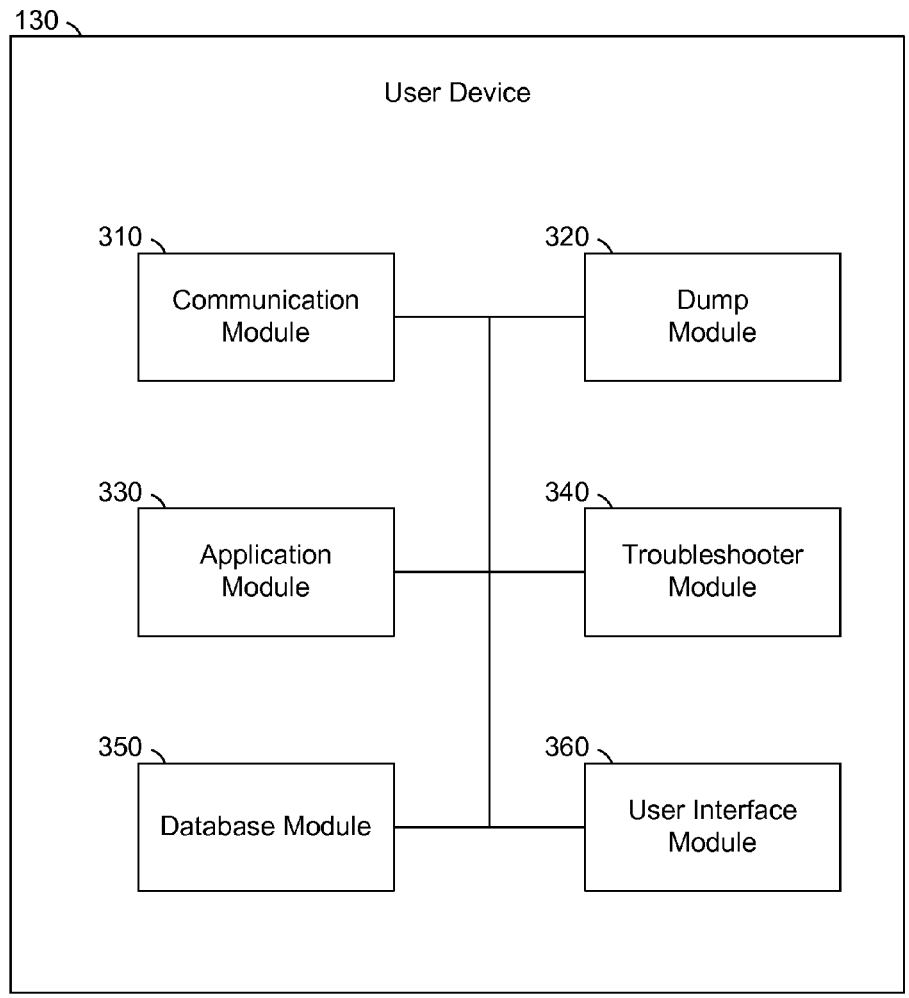
FIG. 3 is a block diagram of a user device, according to some example embodiments, suitable for generating and presenting system diagnostics with thread dump analysis.

FIG. 3 is a block diagram illustrating components of the user device 130 or 150, according to some example embodiments, suitable for generating and presenting system diagnostics with thread dump analysis. The user device 130 or 150 is shown as including a communication module 310, a dump module 320, an application module 330, a troubleshooter module 340, a database module 350, and a user interface module 360 all configured to communicate with each other (e.g., via a bus, shared memory, or a switch). Each module 310-350 may be implemented in a manner similar to the corresponding module 210-250, as described above with respect to FIG. 2.

Figure 4:
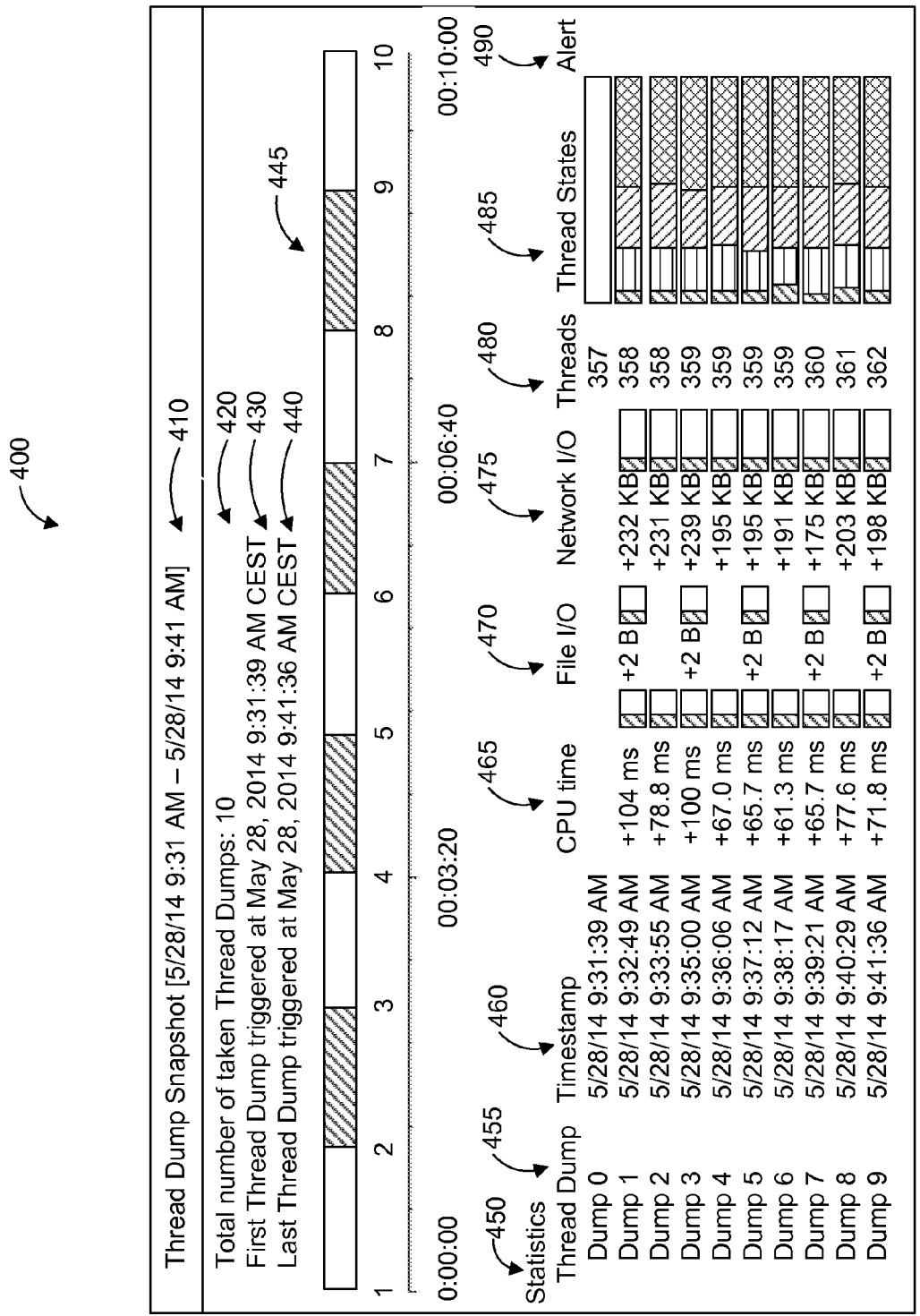
FIG. 4 is a user interface diagram, according to some example embodiments, suitable for presenting system diagnostics with thread dump analysis.

The user interface module 360 presents an interactive user interface to a user of the device 130 or 150. Example user interface diagrams are shown in FIG. 4 and FIG. 5, but other interfaces may also be presented by the device 130 or 150. The user interface may be presented on a web browser, from a dedicated application, or from within a component of a larger application.

FIG. 4 is a user interface diagram 400, according to some example embodiments, suitable for presenting system diagnostics with thread dump analysis. The user interface diagram 400 includes a title 410, summary data 420-440, a timing distribution bar 445, and a table 450 of data regarding the dumps including columns 455-490 with name, timestamp, relative CPU time, relative file I/O, relative network I/O, number of threads, thread state, and alert data for each thread dump. The user interface diagram 400 corresponds to a user interface presented by the user interface module 360, in some example embodiments.

The title 410 indicates the date and time over which the thread dumps were taken. The summary data 420 indicates that the number of thread dumps being analyzed is 10. The summary data 430 indicates that the date and time of the first thread dump is May 28, 2014 at 9:31:39 AM CEST. The summary data 440 indicates that the date and time of the last thread dump in the set is May 28, 2014 at 9:41:36 AM CEST. The timing distribution bar 445 shows the relative time at which each of the thread dumps in the set was created. As shown in FIG. 4, the thread dumps were generated at even intervals over 10 minutes. In some example embodiments, thread dumps are automatically generated at evenly spaced intervals in response to a user request that identifies the application, a total number of dumps to generate, and a time period over which to generate the dumps. In other example embodiments, thread dumps are individually generated in response to user commands.

The table 450 includes information for each thread dump in the set. The data in each of the columns 455-490 includes a header indicating the data being shown, along with corresponding data for one of the thread dumps in the set. For example, the third row of the table 450 shows that the name of the thread dump is "Dump 2" in the thread dump column 455, that the date/time of the thread dump is May 28, 2014 9:33:55 AM in the timestamp column 460, that the amount of CPU time consumed since the previous thread dump is 78.8 ms in the CPU time column 465, that no file I/O occurred since the previous dump in the file I/O column 470, that 231 kb of data were read or written since the previous dump in the network I/O column 475, that 358 threads are running in the thread column 480, that most threads are in the running state in the thread states column 485, and that no alert is generated in the alert column 490.

The thread states column 485 shows a graphical representation of the distribution of thread states for each thread dump. For example, one color or fill pattern can be used to indicate a running state, another color or fill pattern used to indicate a waiting state, and so on. In this way, an application developer can quickly see the change in thread states over time, possibly aiding the developer in homing in on a particular time at which a problem began.

FIG. 5 is a user interface diagram 500, according to some example embodiments, suitable for presenting system diagnostics with thread dump analysis. The user interface diagram 500 includes a section title 505 for hints with very high relevance, a section title 545 for hints with high relevance, a section title 555 for hints with low relevance, hints 510, 515, 540, 550, and 560, and information 520-535 regarding the hint 515. The user interface diagram 500 corresponds to a user interface presented by the user interface module 360, in some example embodiments.

The section title 505 indicates that the hints below are those determined to be of very high relevance. The hint 510 is for a socket that is not making I/O progress. A plus sign is shown adjacent to the hint 510, indicating that the hint 510 can be expanded to show additional information. The hint 515 is also for a socket that is not making I/O progress. A minus sign is shown adjacent to the hint 515, indicating that the hint 515 is expanded to show additional information and can be collapsed to hide the additional information.

The information 520 identifies the thread which is experiencing socket I/O without progress, the machine and port of the socket, the amount of time the I/O has failed to progress, and the percentage of the thread's running time spent on the unproductive I/O. The name of the thread is underlined, indicating that it can be activated to provide more information regarding the thread. For example, the name of the thread may be a hyperlink operable to cause the presentation of thread data in a pop-up window. The information 525 provides a suggestion as to a possible cause of the problem. The information 525 may be retrieved from a database based on the type of problem identified, data for the thread, data for the problem, or any suitable combination thereof. The information 530 includes the thread's stack, showing the method running at the time of the thread dump. The information 535 indicates that more methods of the stack are available and may be operable to show some or all of the additional methods.

The hints 540, 550, and 560 are for a method hotspot, a passive thread, and a lock contention, respectively. Each of the hints 540, 550, and 560 is shown with a plus sign, indicating that more information is available. The hints 540, 550, and 560 also include a short description of the thread status.

FIG. 6 is a table 600 of relevance ratings, according to some example embodiments, suitable for generating and presenting system diagnostics with thread dump analysis. When a hint is generated, a numeric value to the relevance of the hint can be generated based on information about the thread and the hint. For example, a certain type of hint related to a critical issue may have a minimum relevance of 0.4 while another type of hint related to an issue that is rarely key may have a maximum relevance of 0.6. Similarly, for a particular hint, the relevance may be determined based on the particular information about the thread causing the hint. For example, if a hint is generated for socket I/O without progress, the relevance can increase in proportion to the length of time for which the socket has failed to make progress. The table 600 shows numeric relevance ratings in the range of 0-1, but other ranges may also be used. The text relevance rating can be used for presentation to a user. Additionally or alternatively, the numeric relevance rating can be discarded after calculation and an identifier for the text relevance rating stored.

Figure 7:
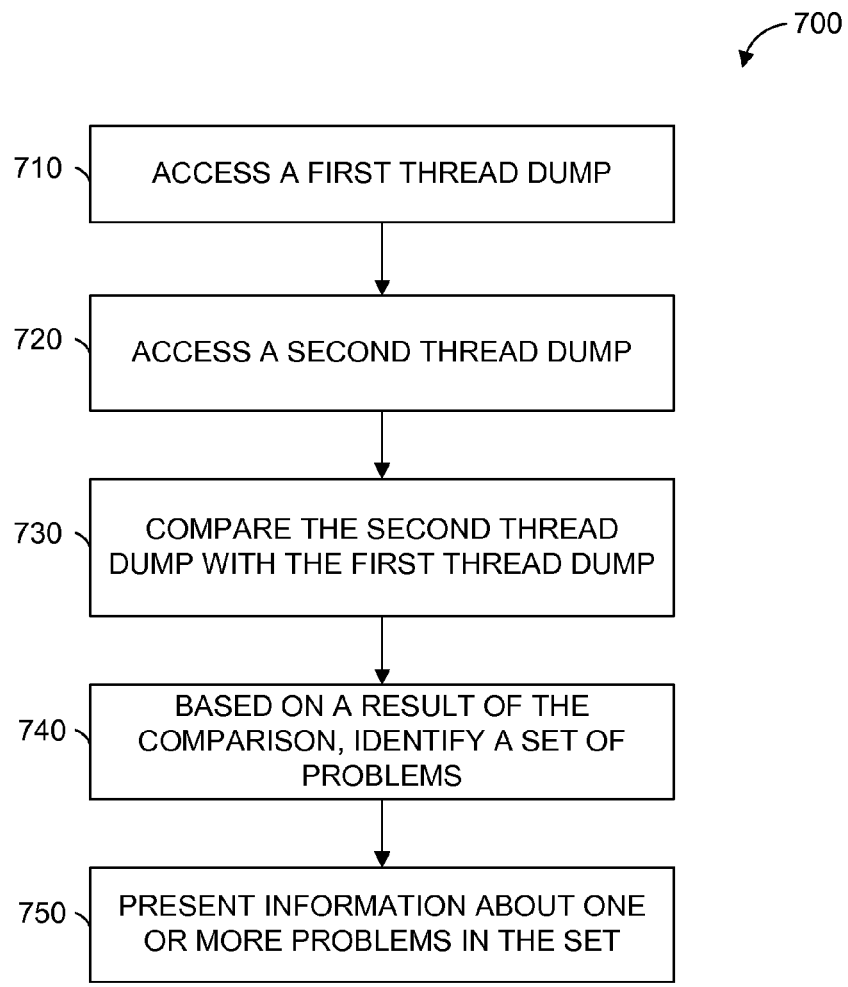
FIG. 7 is a flowchart illustrating an example method, according to some example embodiments, of devices performing various operations to generate and present system diagnostics with thread dump analysis.

FIG. 7 is a flowchart illustrating operations of the server 110 in performing a method 700 of generating and presenting system diagnostics with thread dump analysis, according to some example embodiments. Operations in the method 700 may be performed by the server 110, using modules described above with respect to FIG. 2. As shown in FIG. 7, the method 700 includes operations 710, 720, 730, 740, and 750.

In operation 710, the troubleshooter module 240 accesses a first thread dump for an application via the database module 250. In some example embodiments, the thread dump is a binary or human-readable data file.

The troubleshooter module 240, in operation 720, accesses a second thread dump for the application via the database module 250. The second thread dump may have been generated by the same run of the application at a later time than the first thread dump.

Having accessed the two thread dumps, the troubleshooter module 240 compares the second thread dump with the first thread dump in operation 730. The comparison of the two thread dumps may include comparison of aggregate data (e.g., total number of threads running or total amount of memory consumed), thread-level data (e.g., stack traces for a particular thread in both thread dumps, memory consumption by a particular thread in both thread dumps), or both. An example implementation of the operation 730 is discussed below, with respect to FIG. 9 and FIG. 10.

A problem is identified by the troubleshooter module 240, in operation 740, based on a result of the comparison performed in operation 730. For example, the comparison may reveal that a thread's stack trace is unchanged and that it has consumed no CPU cycles in the period between the two thread dumps. Based on these results, the passive state of the thread can be identified as a problem.

Information about the problem identified in operation 740 is presented to the user (operation 750). For example, any or all of the following may be presented: the state of a thread for which the problem was detected can be presented, a recommendation for a solution to the problem, ways to gather more information regarding the problem, or other relevant or useful information.

Addressing operations 730-750 together, below are several types of hints that may be generated and presented based on identified problems from the comparison of two thread dumps.

A hint that socket I/O is without progress may be made based on a determination that a thread is reading from or writing to a socket without any progress over a period of time (e.g., over a period of time exceeding a predetermined threshold). Progress may be measured by the number of bytes transferred, the amount of CPU time consumed, or both. The information presented can include the host name and port number of the socket. The relevance of the hint can be based on the amount of time for which no progress has occurred. A suggestion that the user perform a network I/O analysis for the thread may be made based on the determination that socket I/O without progress is occurring.

A hint that a thread has entered a passive state may be made based on a determination that the thread is not consuming any resources over a period of time. For example, if the thread is not consuming any CPU time, allocating any memory, or performing any I/O, the thread may be found to be in a passive state. A suggestion that the user check to see if the CPUs are overloaded with operating system-level tools may be made based on the determination that a thread is in a passive state. The relevance factor can be based on the amount of time that the thread has been passive. Additionally or alternatively, a suggestion that the user attach a native profiler to check if the thread execution is locked (e.g., within the JVM) may be made.

A hint that a thread is a top consumer may be made based on a determination that the thread consumes a resource at a much greater rate than other threads in the application. For example, the thread may consume a greater amount of CPU cycles, perform a greater amount of socket I/O, perform a greater amount of file I/O, consume a greater amount of heap space, or any suitable combination of these. In some example embodiments, the mean and standard deviation of consumption of the resource by all threads is calculated and the top consumers are identified by exceeding a predetermined number of standard deviations above the mean. The relevance can be based on the degree to which the top consumer exceeds the mean. In other example embodiments, the thread that consumes the most of each type of resource is identified as a top consumer of that resource. A suggestion that the user perform a performance hotspot analysis on the thread, perform network I/O analysis, file I/O analysis, allocation analysis, or any suitable combination thereof may be made based on the type of resource or resources for which the thread is a top consumer.

A hint that a thread is blocked may be made based on a determination that a thread is blocked by other threads over a significant portion of the elapsed time. Information presented can include information regarding the lock objects on which the thread is blocked and the threads owning those lock objects. The relevance can be based on the percentage of time that the thread is blocked. A suggestion that the user perform a synchronization analysis may be based on the determination that the thread is blocked.

A hint regarding lock contention may be generated based on a determination that a high total blocking time of threads is spent waiting for a lock object. The hint may indicate the thread currently holding the lock object. The relevance can be based on the percentage of blocking time attributable to the lock object. A suggestion that the user perform a synchronization analysis may be based on the determination that the lock is under contention.

A hint that an application is suffering from a resource leak may be based on a determination that consumption of a resource is growing. For example, the number of threads, number of open sockets, number of open files, total amount of memory allocated, and total amount of CPU cycles consumed can be monitored. In some example embodiments, a linear approximation is made for the consumption of the resource over time, based on a set of thread dumps. The relevance can be based on the gradient of the resulting line. A suggestion that the user perform an analysis of the resource that is leaking may be based on the determination that a resource leak is present. For example, a performance hotspot analysis can be recommended for growing CPU consumption, network I/O analysis can be recommended for increasing numbers of open sockets, file I/O analysis can be recommended for increasing numbers of open files, and allocation analysis can be recommended for increasing memory consumption.

A hint that an application has a method hotspot may be based on a determination that the number of times a particular method is run exceeds a threshold. The threshold can be based on a frequency analysis. For example, a statistical analysis of all methods run by all threads during the sample period can generate a mean frequency and standard deviation for all methods. If the frequency for a particular method exceeds the mean by a predetermined number of standard deviations, that method can be identified as a method hotspot. The relevance can be based on the amount that the method exceeds the mean. A suggestion that the user perform a performance hotspot trace for the method can be generated based on the determination that the method is a method hotspot for the application.

A hint that the application suffers a livelock may be based on a determination that one or more threads are consuming CPU cycles without performing productive work. The determination that a thread is livelocked can be made based on a high CPU consumption (e.g., within a predetermined threshold of the maximum possible for the elapsed time) and a strong method locality (e.g., the stack trace for the thread in sequential dumps is unchanging or only changes in a few of the topmost frames). The relevance can be based on the CPU consumption and degree of method locality. A suggestion that the user perform hotspot analysis, method parameter analysis, or both can be generated based on the determination that the application has one or more livelocked threads.

A hint that the application is deadlocked may be based on a determination that a set of threads transitively block each other. The information presented to the user may include identifying all threads that are part of the deadlock cycle, all threads that are indirectly blocked by the deadlock but are not part of the cycle, or both. The relevance is always high. A suggestion that the user examine the design of the deadlocked code can be generated based on the determination that the application is deadlocked.

Figure 8:
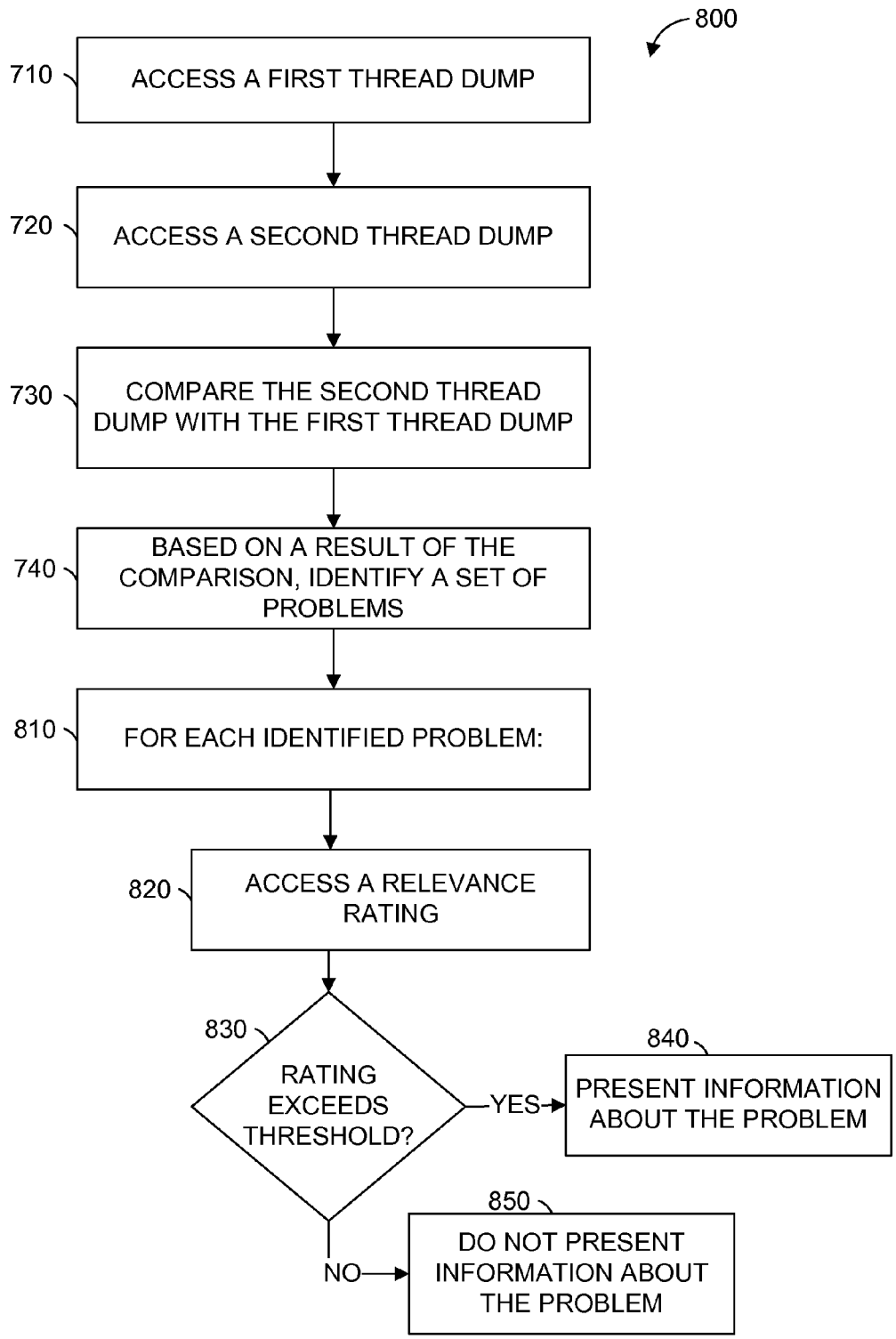
FIG. 8 is a flowchart illustrating an example method, according to some example embodiments, of devices performing various operations to generate and present system diagnostics with thread dump analysis.

FIG. 8 is a flowchart illustrating operations of a method 800 of generating and presenting system diagnostics with thread dump analysis, according to some example embodiments. Operations in the method 800 are described as being performed by the server 110, using modules described above with respect to FIG. 2, by way of example only. As shown in FIG. 8, the method 800 includes operations 710, 720, 730, 740, 810, 820, 830, 840, and 850. Operations 710, 720, 730, and 740 are described above with respect to FIG. 7.

In operation 810, the troubleshooter module 240 begins a loop to handle the processing of each problem identified in operation 740. The operations 820-850 are performed for each identified problem.

The troubleshooter module 240 accesses a relevance rating for the problem (e.g., via the database module 250), in the operation 820. The relevance rating may have been determined during the operation 740, at the time the problem was identified. Alternatively, a flag indicating the presence of the problem may have been set during the operation 740 and the determination of the relevance rating of the problem may be created during the operation 820.

The troubleshooter module 240 compares the relevance rating to a threshold (operation 830) to determine if information about the problem should be presented (operation 840) or not (operation 850). The threshold may be numeric (e.g., all problems with a relevance rating of at least 0.5 are presented) or category-based (e.g., all problems with at least a High Relevance are presented). The threshold may be automatically determined by the system, or selected by the user (e.g., by using a graphical user interface presented by the user interface module 360 to cause selected options to be stored in a database by the database module 250 or 350).

Figure 9:
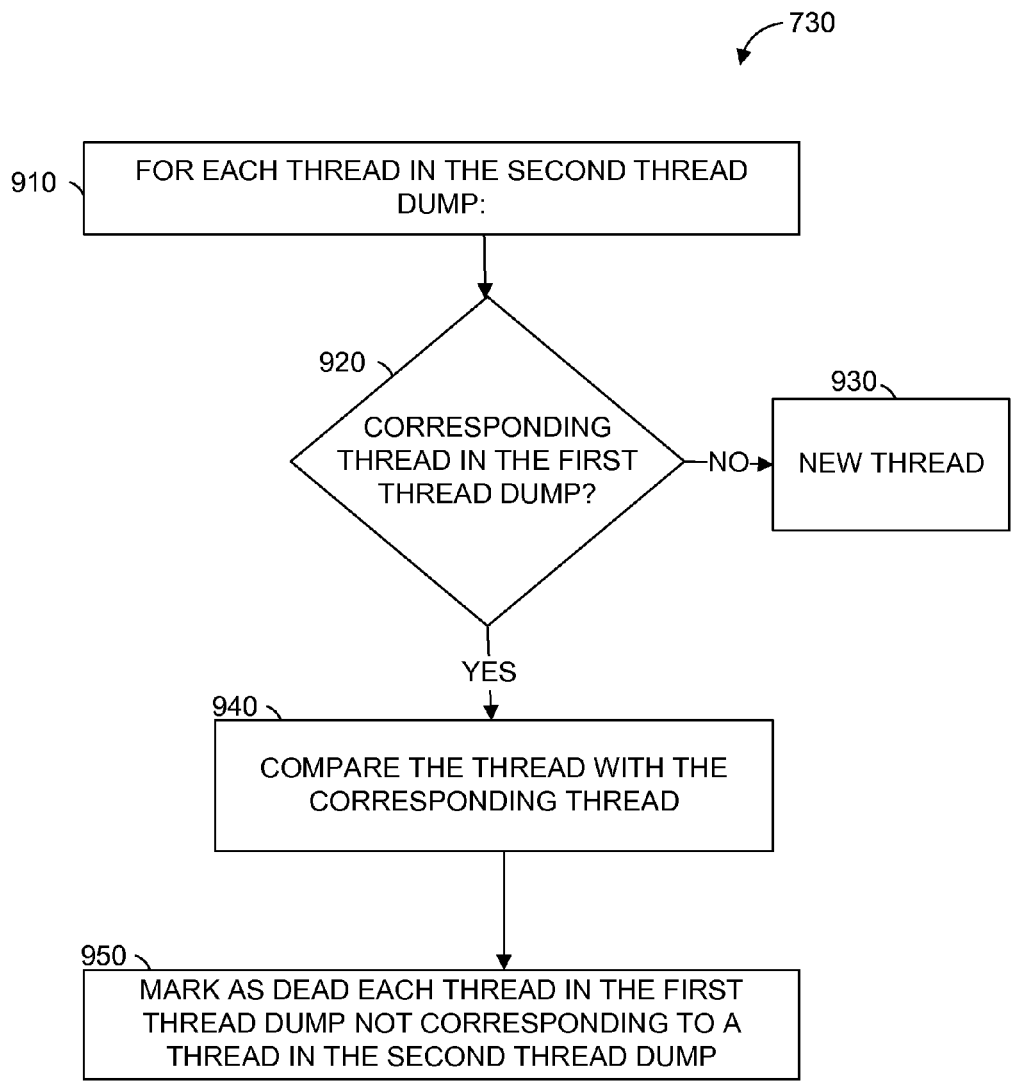
FIG. 9 is a flowchart illustrating more detailed operations of an example method to implement operation 730 of FIG. 7, according to some example embodiments, of devices performing various operations to generate and present system diagnostics with thread dump analysis.

FIG. 9 is a flowchart illustrating more detailed operations of a method to implement operation 730 of FIG. 7, according to some example embodiments. Operations in the method of FIG. 9 are described as being performed by the server 110, using modules described above with respect to FIG. 2, by way of example only. As shown in FIG. 9, the method of implementing the operation 730 includes operations 910, 920, 930, 940, and 950.

In operation 910 a loop is begun to handle the processing of each thread in the second thread dump. The operations 920-950 are performed, as appropriate, for each identified thread.

The troubleshooter module 240 makes a determination as to whether the first thread dump contains a thread corresponding to the identified thread (operation 920). If no corresponding thread is found, the thread is identified as a new thread (operation 930). If a corresponding thread is found, processing of the identified thread continues in operation 940.

Figure 10:
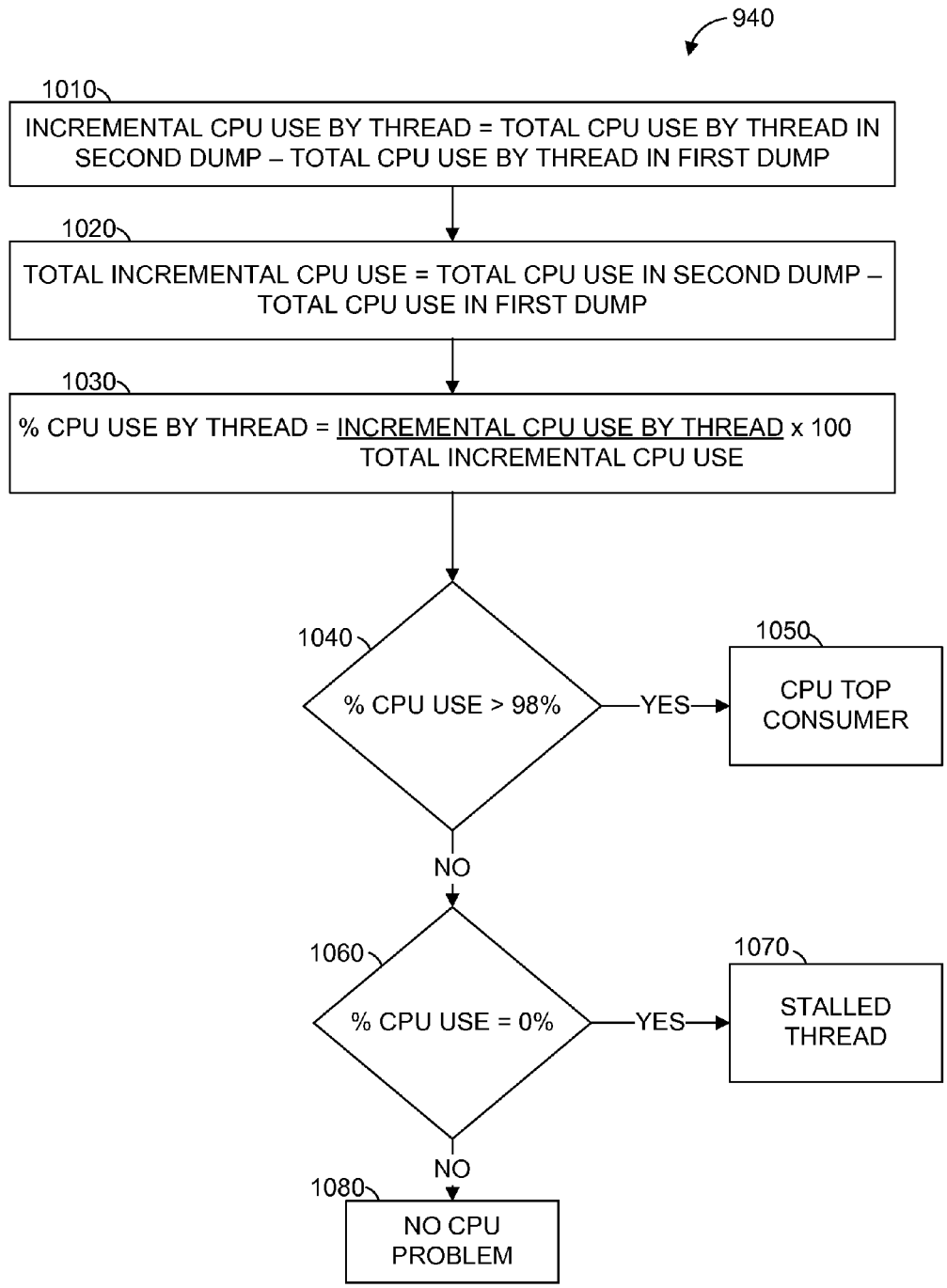
FIG. 10 is a flowchart illustrating more detailed operations of an example method to implement operation 940 of FIG. 9, according to some example embodiments, of devices performing various operations to generate and present system diagnostics with thread dump analysis.

Having found two corresponding threads, the troubleshooter module 240 compares the thread in the second thread dump with the corresponding thread in the first thread dump (operation 940). For example, the stacks may be compared, the amount of CPU consumption may be compared, the amount of memory allocation may be compared, the amount of file I/O may be compared, and so on. FIG. 10, discussed below, shows one example implementation of the operation 940.

The troubleshooter module 240 marks each thread in the first thread dump not corresponding to a thread in the second thread dump as having died between the two thread dumps, in operation 950. For example, a data structure used to store information for each thread can be updated to reflect the fact that the thread died, the last known live time for the thread, an identifier for the first thread dump in which the thread does not appear, or any suitable combination thereof. The data structure can include a thread identifier, pointers to information for the thread in each of the thread dumps, various status indicators (e.g., whether the thread is dead or alive in the latest thread dump, whether any hints have been generated for the thread, and so on), data for presentation in a user interface, or any suitable combination thereof.

FIG. 10 is a flowchart illustrating more detailed operations of a method to implement operation 940 of FIG. 9, according to some example embodiments. Operations in the method of FIG. 10 are described as being performed by the server 110, using modules described above with respect to FIG. 2, by way of example. The shown implementation of operation 940 addresses identification of CPU use problems, but modification to address identification of other problems is straightforward. As shown in FIG. 10, the method of implementing the operation 940 includes operations 1010, 1020, 1030, 1040, 1050, 1060, 1070, and 1080.

The troubleshooter module 240 determines the incremental CPU use by a thread by subtracting the total CPU use by the thread in an earlier thread dump from the total CPU use by the thread in a later thread dump (operation 1010). For example, if the total CPU consumption by the thread in the second thread dump is 5 seconds and the total CPU consumption by the thread in the first thread dump is 4 seconds, the incremental CPU use by the thread in the interim is 1 second.

In operation 1020, the total incremental CPU use by the application is determined by subtracting the total CPU use by the application in the earlier thread dump from the total CPU use by the application in the later thread dump. For example, if the total CPU use by the application in the second thread dump is 60 seconds and the total CPU consumption by the thread in the first thread dump is 45 seconds, the incremental CPU use by the application in the interim is 15 seconds.

The percentage of incremental CPU use attributable to the thread is determined by dividing the incremental CPU use of the thread by the incremental CPU use of the application, and multiplying by 100 (operation 1030). Continuing with the example case, the percentage of incremental CPU use for the thread is about 6.7%.

In operation 1040, the percentage of incremental CPU use attributable to the thread is compared to a threshold (e.g., 98%), to determine if the thread is a CPU top consumer (operation 1050) or not. If not, operation 1060 is performed. In the example case, 6.7% is less than the threshold, so the thread is not marked as a top consumer.

After determining that the percentage of incremental CPU use falls below the top consumer threshold, the percentage of incremental CPU use attributable to thread is compared (operation 1060) to a stall threshold (e.g., 0%), to determine if the thread is stalled (operation 1070) or not. In the example case, 6.7% is greater than the threshold, so the thread is not marked as stalled. Accordingly, in the example case, no CPU problem is identified for the thread (operation 1080).

Figure 11:
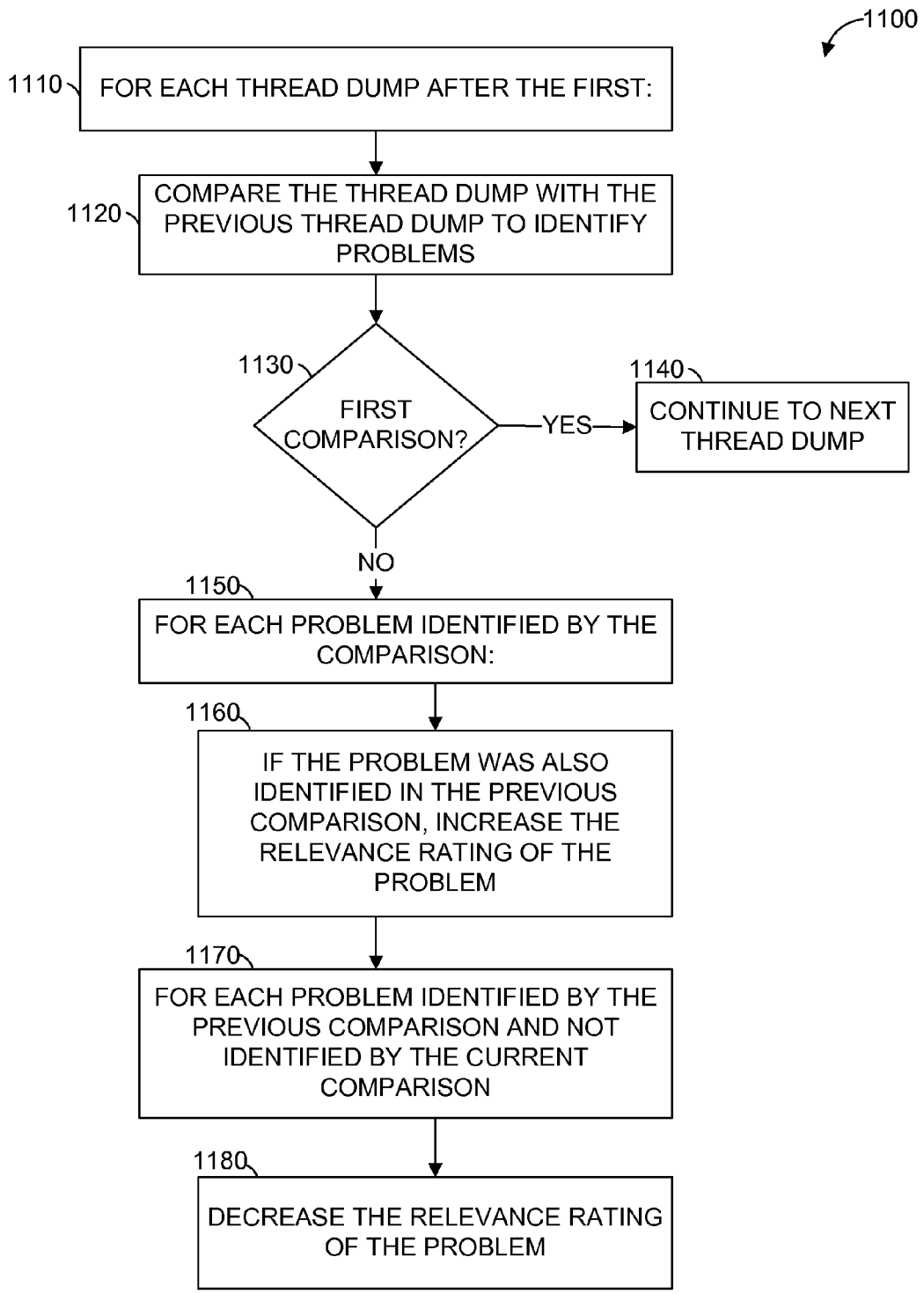
FIG. 11 is a flowchart illustrating an example method, according to some example embodiments, of devices performing various operations to generate and present system diagnostics with thread dump analysis.

FIG. 11 is a flowchart illustrating a method 1100 to generate and present system diagnostics with thread dump analysis, according to some example embodiments. Operations in the method 1100 may be performed by the server 110, using modules described above with respect to FIG. 2. As shown in FIG. 11, the method 1100 includes operations 1110, 1120, 1130, 1140, 1150, 1160, 1170, and 1180.

A loop is begun to iterate over a series of thread dumps, beginning with the second, in operation 1110. For each such thread dump, operations 1120-1180 are performed, as appropriate.

The thread dump is compared with the previous thread dump in operation 1120. For example, operations 710-740 of the method 700 may be used to compare two thread dumps and identify a set of problems.

The first comparison is treated differently than subsequent comparisons (operation 1130). For the first comparison, the loop continues to the next thread dump after the comparison (operation 1140). For subsequent comparisons, processing continues with operation 1150.

In operation 1150, processing loops over the set of problems identified by the current comparison. Accessing the set of problems identified in the previous comparison, a determination is made as to whether each identified problem was also identified by the previous comparison. If the identified problem was identified by both comparisons, the relevance rating for the problem is increased (operation 1160).

In operation 1170, processing loops over the set of problems identified by the previous comparison and not identified by the current comparison. For each such problem, the relevance rating of the problem is decreased (operation 1180).

Figure 12:
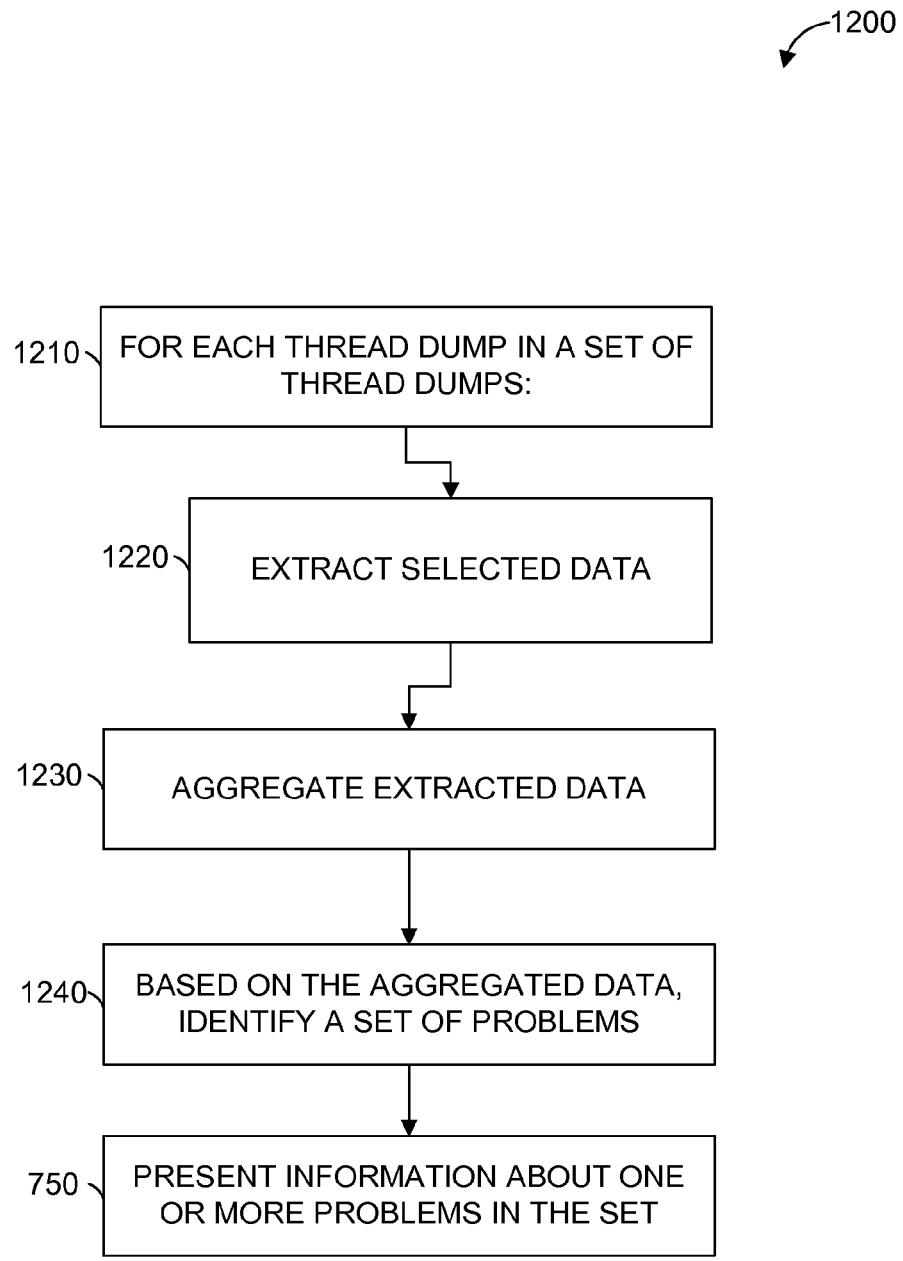
FIG. 12 is a flowchart illustrating an example method, according to some example embodiments, of devices performing various operations to generate and present system diagnostics with thread dump analysis.

FIG. 12 is a flowchart illustrating a method 1200 to generate and present system diagnostics with thread dump analysis, according to some example embodiments. Operations in the method 1200 may be performed by the server 110, using modules described above with respect to FIG. 2. As shown in FIG. 12, the method 1200 includes operations 1210, 1220, 1230, 1240, and 750. The operation 750 is described above with respect to FIG. 7.

The method loops over a set of thread dumps (operation 1210) to extract selected data (operation 1220). For example, the incremental CPU consumption by each thread can be extracted, the amount of memory consumed by the application can be extracted, or other data can be extracted.

The extracted data is then aggregated, in operation 1230. For example, the total CPU consumption by each thread over the time period spanned by the thread dumps can be determined as an aggregate value. Similarly, the rate of change of memory consumption over the time period spanned by the thread dumps can be determined as an aggregate value.

In operation 1240, a set of problems is identified based on the aggregated data. For example, if the total CPU consumption by a thread exceeds a threshold, the thread may be identified as a CPU top consumer. As another example, if the memory consumption of the application is increasing at a rate that exceeds a threshold, a memory leak may be identified.

In operation 750, information about one or more problems of the set of identified problems is presented to the user, as described in more detail above, with respect to FIG. 7.

According to various example embodiments, one or more of the methodologies described herein may facilitate identification and solution of problems in systems running software applications. Moreover, one or more of the methodologies described herein may facilitate the efficient use of computing resources. According to various example embodiments, hints provided by the system diagnostics with thread dump analysis may allow a developer or system administrator to identify problems without running an entire suite of diagnostic tools, maximizing the impact of development, maintenance, or testing efforts.

When these effects are considered in aggregate, one or more of the methodologies described herein may obviate a need for certain efforts or resources that otherwise would be involved in system diagnostics. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 13:
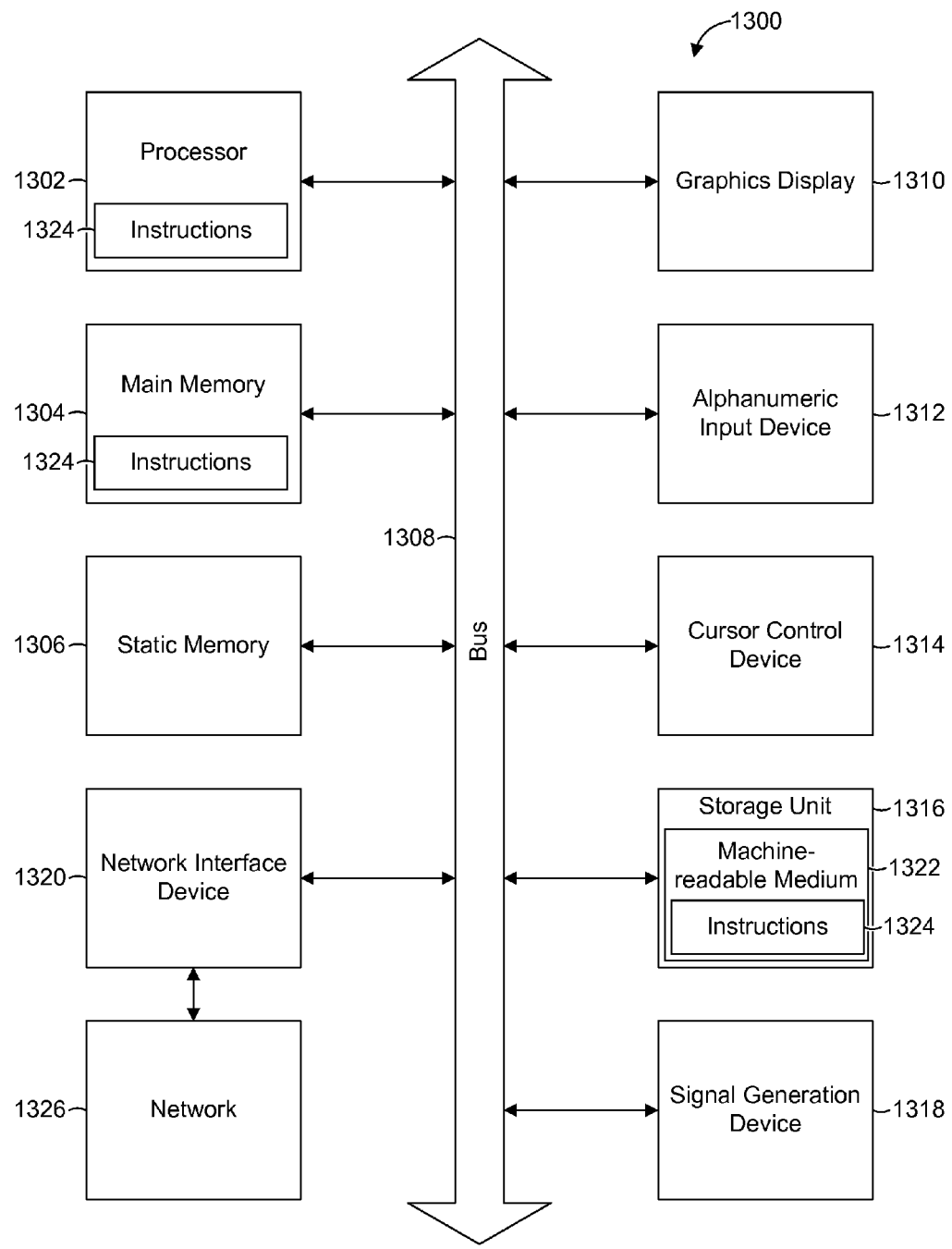
FIG. 13 is a block diagram illustrating components of a machine, according to some example embodiments, for performing any of the methodologies described herein.

FIG. 13 is a block diagram illustrating components of a machine 1300, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 13 shows a diagrammatic representation of the machine 1300 in the example form of a computer system and within which instructions 1324 (e.g., software, a program, an application, an applet, an app, or other executable code) for causing the machine 1300 to perform any one or more of the methodologies discussed herein may be executed, in whole or in part. In alternative embodiments, the machine 1300 operates as a standalone device or may be connected (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include a collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The machine 1300 may further include a graphics display 1310 (e.g., a plasma display panel (PDP), a light emitting diode (LED) display, a liquid crystal display (LCD), a projector, or a cathode ray tube (CRT)). The machine 1300 may also include an alphanumeric input device 1312 (e.g., a keyboard), a cursor control device 1314 (e.g., a mouse, a touchpad, a trackball, a joystick, a motion sensor, or other pointing instrument), a storage unit 1316, a signal generation device 1318 (e.g., a speaker), and a network interface device 1320.

The storage unit 1316 includes a machine-readable medium 1322 on which is stored the instructions 1324 embodying any one or more of the methodologies or functions described herein. The instructions 1324 may also reside, completely or at least partially, within the main memory 1304, within the processor 1302 (e.g., within the processor's cache memory), or both, during execution thereof by the machine 1300. Accordingly, the main memory 1304 and the processor 1302 may be considered as machine-readable media. The instructions 1324 may be transmitted or received over a network 1326 (e.g., network 190) via the network interface device 1320.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1300), such that the instructions, when executed by one or more processors of the machine (e.g., processor 1302), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated examples define various example embodiments of methods, machine-readable media, and systems (e.g., apparatus) discussed herein:

Example 1

A method comprising:
accessing a first thread dump from an execution of an application;
accessing a second thread dump from the execution of the application;
performing, by a processor of a machine, a comparison of the second thread dump with the first thread dump;
based on the comparison, identifying a problem in the execution of the application; and
causing a presentation of information about the identified problem to a user.

Example 2

The method of example 1, further comprising:
based on the comparison, identifying a potential problem in the execution of the application;
determining, for the identified problem and the potential problem, a relevance value;
based on the relevance value for the potential problem being below a threshold, not causing a presentation of information about the potential problem to the user; and wherein
the causing of the presentation of information about the identified problem is based on the relevance value for the identified problem being above the threshold.

Example 3

The method of example 1 or example 2, wherein the identified problem is a deadlock.

Example 4

The method of any suitable one of examples 1-3, further comprising:
accessing a third thread dump from the execution of the application;
performing a comparison of the third thread dump with the second thread dump; and wherein
the identifying of the problem in the execution in the application is further based on the comparison of the third thread dump with the second thread dump.

Example 5

The method of any suitable one of examples 1-4, wherein:
the first thread dump includes a first total CPU time consumed by a thread;
the second thread dump includes a second total CPU time consumed by the thread; and
the comparison of the first thread dump with the second thread dump includes a comparison of the first total CPU time and the second total CPU time.

Example 6

The method of any suitable one of examples 1-5, wherein:
the first thread dump includes a first number of bytes allocated for a thread;
the second thread dump includes a second number of bytes allocated for the thread; and
the comparison of the first thread dump with the second thread dump includes a comparison of the first number of bytes allocated and the second number of bytes allocated.

Example 7

The method of any suitable one of examples 1-6, wherein:
the first thread dump includes a first number of files opened by a thread;
the second thread dump includes a second number of files opened by the thread; and
the comparison of the first thread dump with the second thread dump includes a comparison of the first number of files opened and the second number of files opened.

Example 8

The method of any suitable one of examples 1-7, wherein:
the first thread dump includes a first number of sockets opened by a thread;
the second thread dump includes a second number of sockets opened by the thread; and
the comparison of the first thread dump with the second thread dump includes a comparison of the first number of sockets opened and the second number of sockets opened.

Example 9

The method of any suitable one of examples 1-8, wherein:
the first thread dump includes a first number of bytes read from a file by a thread;
the second thread dump includes a second number of bytes read from the file by the thread; and
the comparison of the first thread dump with the second thread dump includes a comparison of the first number of bytes and the second number of bytes read from the file.

Example 10

The method of any suitable one of examples 1-9, wherein:
the first thread dump includes a first number of bytes written to a socket by a thread;
the second thread dump includes a second number of bytes written to the socket by the thread; and
the comparison of the first thread dump with the second thread dump includes a comparison of the first number of bytes and the second number of bytes written to the socket.

Example 11

The method of any suitable one of examples 1-10, wherein:
the second thread dump was generated at a predetermined interval after the first thread dump.

Example 12

The method of example 11, further comprising receiving the predetermined interval from the user.

Example 13

The method of any suitable one of examples 1-12, wherein the identified problem is a livelock.

Example 14

The method of any suitable one of examples 1-12, wherein the identified problem is a stalled socket communication.

Example 15

A system comprising:
a database module, configured to:
  access a first thread dump from an execution of an application; and
  access a second thread dump from the execution of the application;
a troubleshooter module, configured to:
  perform a comparison of the second thread dump with the first thread dump; and
  based on the comparison, identify a problem in the execution of the application; and
a user interface module, configured to:
  cause a presentation of information about the identified problem to a user.

Example 16

The system of example 15, wherein:
the troubleshooter module is further configured to:
  based on the comparison, identify a potential problem in the execution of the application; and
  determine, for the identified problem and the potential problem, a probability of relevance; and
the user interface module is further configured to:
  based on the probability of relevance for the potential problem being below a threshold, not cause a presentation of information about the potential problem to the user; and wherein
the causing of the presentation of information about the identified problem by the user interface module is based on the probability of relevance for the identified problem being above the threshold.

Example 17

The system of example 15 or example 16, wherein the identified problem is a deadlock.

Example 18

The system of any suitable one of examples 15-17, wherein:
the database module is further configured to:
  access a third thread dump from the execution of the application; and
the troubleshooter module is further configured to:
  perform a comparison of the third thread dump with the second thread dump; and wherein
the identifying of the problem in the execution in the application by the troubleshooter module is further based on the comparison of the third thread dump with the second thread dump.

Example 19

The system of any suitable one of examples 15-18, wherein the database module and the troubleshooter module are different modules.

Example 20

A non-transitory machine-readable storage medium comprising instructions that, when executed by one or more processors of a machine, cause the machine to perform operations comprising:
accessing a first thread dump from an execution of an application;
accessing a second thread dump from the execution of the application;
performing, by a processor of a machine, a comparison of the second thread dump with the first thread dump;
based on the comparison, identifying a problem in the execution of the application; and
causing a presentation of information about the identified problem to a user.

What is claimed is:

1. A method comprising:
accessing a first thread dump from an execution of an application;
accessing a second thread dump from the execution of the application;
performing, by a processor of a machine, a comparison of the second thread dump with the first thread dump;
based on the comparison:
identifying a problem in the execution of the application, and
identifying a potential problem in the execution of the application;
determining, for each of the identified problem and the potential problem, a relevance value;
based on the relevance value for the potential problem being below a threshold, not causing a presentation of information about the potential problem to a user; and
based on the relevance value for the identified problem being above the threshold, causing a presentation of information about the identified problem to the user.

2. The method of claim 1, wherein the identified problem is a deadlock.

3. The method of claim 1, further comprising:
accessing a third thread dump from the execution of the application;
performing, by the processor of the machine, a comparison of the third thread dump with the second thread dump; and wherein
the identifying of the problem in the execution in the application is further based on the comparison of the third thread dump with the second thread dump.

4. The method of claim 1, wherein:
the first thread dump includes a first total CPU time consumed by a thread;
the second thread dump includes a second total CPU time consumed by the thread; and
the comparison of the first thread dump with the second thread dump includes a comparison of the first total CPU time and the second total CPU time.

5. The method of claim 1, wherein:
the first thread dump includes a first number of bytes allocated for a thread;
the second thread dump includes a second number of bytes allocated for the thread; and
the comparison of the first thread dump with the second thread dump includes a comparison of the first number of bytes allocated and the second number of bytes allocated.

6. The method of claim 1, wherein:
the first thread dump includes a first number of files opened by a thread;
the second thread dump includes a second number of files opened by the thread; and
the comparison of the first thread dump with the second thread dump includes a comparison of the first number of files opened and the second number of files opened.

7. The method of claim 1, wherein:
the first thread dump includes a first number of sockets opened by a thread;
the second thread dump includes a second number of sockets opened by the thread; and
the comparison of the first thread dump with the second thread dump includes a comparison of the first number of sockets opened and the second number of sockets opened.

8. The method of claim 1, wherein:
the first thread dump includes a first number of bytes read from a file by a thread;
the second thread dump includes a second number of bytes read from the file by the thread; and
the comparison of the first thread dump with the second thread dump includes a comparison of the first number of bytes and the second number of bytes read from the file.

9. The method of claim 1, wherein:
the first thread dump includes a first number of bytes written to a socket by a thread;
the second thread dump includes a second number of bytes written to the socket by the thread; and
the comparison of the first thread dump with the second thread dump includes a comparison of the first number of bytes and the second number of bytes written to the socket.

10. The method of claim 1, wherein:
the second thread dump was generated at a predetermined interval after the first thread dump.

11. The method of claim 10, further comprising receiving the predetermined interval from the user.

12. The method of claim 1, wherein the identified problem is a livelock.

13. The method of claim 1, wherein the identified problem is a stalled socket communication.

14. A system comprising:
a memory that stores instructions;
one or more processors configured by the instructions to perform operations comprising:
accessing a first thread dump from an execution of an application; and
accessing a second thread dump from the execution of the application;
performing a comparison of the second thread dump with the first thread dump; and
based on the comparison:
identifying a problem in the execution of the application, and
identifying a potential problem in the execution of the application;
determining, for each of the identified problem and the potential problem, a relevance value;
based on the relevance value for the potential problem being below a threshold, not causing a presentation of information about the potential problem to a user; and based on the relevance value for the identified problem being above the threshold, causing a presentation of information about the identified problem to the user.

15. The system of claim 14, wherein the identified problem is a deadlock.

16. The system of claim 14, wherein the operations further comprise:
    accessing a third thread dump from the execution of the application; and
    performing a comparison of the third thread dump with the second thread dump; and wherein
    the identifying of the problem in the execution in the application by the troubleshooter module is further based on the comparison of the third thread dump with the second thread dump.

17. A non-transitory machine-readable storage medium comprising instructions that, when executed by one or more processors of a machine, cause the machine to perform operations comprising:
    accessing a first thread dump from an execution of an application;
    accessing a second thread dump from the execution of the application;
    performing, by a processor of a machine, a comparison of the second thread dump with the first thread dump;
    based on the comparison:
        identifying a problem in the execution of the application, and
        identifying a potential problem in the execution of the application;
    determining, for each of the identified problem and the potential problem a relevance value;
    based on the relevance value for the potential problem being below a threshold, not causing a presentation of information about the potential problem to a user; and
    based on the relevance value for the identified problem being above the threshold, causing a presentation of information about the identified problem to the user.

* * * * *